(12) United States Patent
Colbourne

(10) Patent No.: US 8,300,995 B2
(45) Date of Patent: Oct. 30, 2012

(54) M X N WSS WITH REDUCED OPTICS SIZE

(75) Inventor: Paul Colbourne, Ottawa (CA)

(73) Assignee: JDS Uniphase Corporation, Milpitas, CA (US)

( * ) Notice: Subject to any disclaimer, the term of this patent is extended or adjusted under 35 U.S.C. 154(b) by 307 days.

(21) Appl. No.: 12/826,744

(22) Filed: Jun. 30, 2010

(65) Prior Publication Data

US 2012/0002917 A1  Jan. 5, 2012

(51) Int. Cl.
*G02B 6/26* (2006.01)
*G02B 6/42* (2006.01)

(52) U.S. Cl. ............................................ 385/17; 385/18
(58) Field of Classification Search ................ 385/17, 385/18
See application file for complete search history.

(56) References Cited

U.S. PATENT DOCUMENTS

| | | | |
|---|---|---|---|
| 6,097,859 A | 8/2000 | Solgaard et al. | 385/17 |
| 6,289,145 B1 | 9/2001 | Solgaard et al. | 385/17 |
| 6,327,398 B1 | 12/2001 | Solgaard et al. | 385/18 |
| 6,374,008 B2 | 4/2002 | Solgaard et al. | 385/17 |
| 6,389,190 B2 | 5/2002 | Solgaard et al. | 385/18 |
| 6,404,940 B1 | 6/2002 | Tsuyama et al. | 385/17 |
| 6,437,902 B2 * | 8/2002 | Daneman et al. | 359/290 |
| 6,498,872 B2 | 12/2002 | Bouevitch et al. | 385/24 |
| 6,614,953 B2 | 9/2003 | Strasser et al. | 385/17 |
| 6,707,959 B2 | 3/2004 | Ducellier et al. | 385/17 |
| 6,711,316 B2 | 3/2004 | Ducellier | 385/17 |
| 6,711,320 B2 | 3/2004 | Solgaard et al. | 385/18 |
| 6,760,501 B2 | 7/2004 | Iyer et al. | 385/16 |
| 6,810,169 B2 | 10/2004 | Bouevitch | 385/24 |
| 6,819,823 B2 | 11/2004 | Solgaard et al. | 385/18 |
| 6,834,136 B2 | 12/2004 | Solgaard et al. | 385/18 |
| 6,891,989 B2 | 5/2005 | Zhang et al. | 385/16 |
| 6,922,239 B2 | 7/2005 | Solgaard et al. | 356/326 |
| 7,072,539 B2 | 7/2006 | Wu et al. | 385/18 |
| 7,231,110 B2 * | 6/2007 | Yamamoto et al. | 385/24 |
| 7,336,867 B2 | 2/2008 | Wu et al. | 385/18 |
| 7,440,648 B2 * | 10/2008 | Oikawa et al. | 385/16 |
| 7,469,080 B2 | 12/2008 | Strasser et al. | 385/17 |
| 7,620,321 B2 * | 11/2009 | Miura et al. | 398/45 |
| 7,626,754 B2 | 12/2009 | Reimer | 359/325 |
| 7,702,194 B2 * | 4/2010 | Presley et al. | 385/18 |

(Continued)

OTHER PUBLICATIONS

"M X N Wavelength Selective Optical Switch" by Paul Colbourne, U.S. Appl. No. 12/367,160, filed Feb. 6, 2009.

*Primary Examiner* — Daniel Petkovsek
(74) *Attorney, Agent, or Firm* — Teitelbaum & MacLean; Neil Teitelbaum; Doug MacLean

(57) ABSTRACT

A M×N wavelength selective switch (WSS) module capable of independently routing any wavelength channel from any input port to any output port is provided. The M×N WSS includes a first beam relayer including first and second elements having optical power, each of which is disposed such that light transmitted to or from a first plurality of ports passes through a common point. The M×N WSS also includes a wavelength dispersive element, a first switching array having M rows including K switching elements, a second beam relayer, and a second switching array including N switching elements. The second switching array includes an optical by-pass disposed at the common point, which provides means for separating the input and output beams of light, and which allows both the input and output optical beams to traverse similar paths throughout the optical train.

21 Claims, 14 Drawing Sheets

U.S. PATENT DOCUMENTS

| | | | |
|---|---|---|---|
| 7,933,519 B2 * | 4/2011 | Akiyama et al. | 398/50 |
| 8,000,568 B2 * | 8/2011 | Presley et al. | 385/18 |
| 8,045,854 B2 * | 10/2011 | Colbourne | 398/48 |
| 8,081,875 B2 * | 12/2011 | Keyworth et al. | 398/47 |
| 8,190,025 B2 * | 5/2012 | Presley et al. | 398/48 |
| 2006/0067611 A1 | 3/2006 | Frisken et al. | 385/16 |
| 2006/0198583 A1 | 9/2006 | Oikawa et al. | 385/53 |
| 2006/0210266 A1 | 9/2006 | Aoki | 398/19 |
| 2007/0242953 A1 | 10/2007 | Keyworth et al. | 398/48 |

* cited by examiner

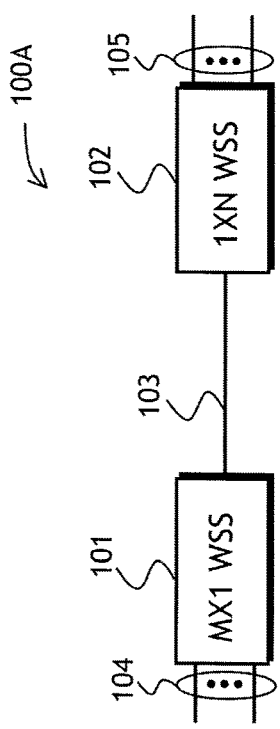
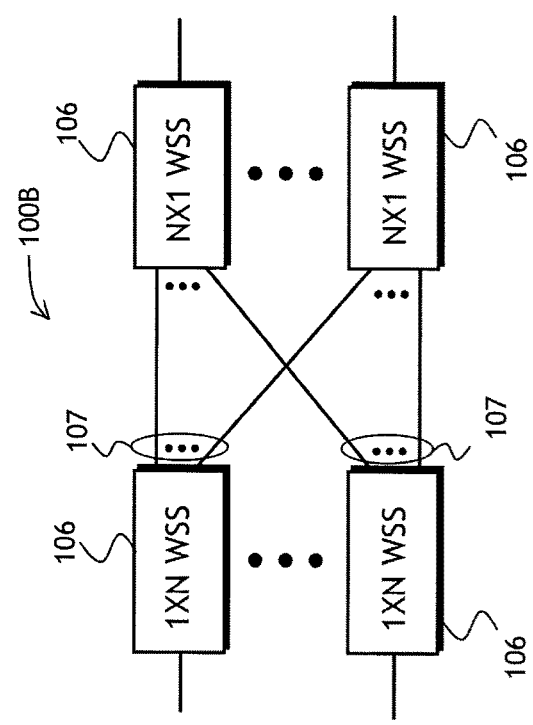
Fig. 1A
Fig. 1B

M X N WSS WITH REDUCED OPTICS SIZE

CROSS-REFERENCE TO RELATED APPLICATIONS

Not Applicable.

TECHNICAL FIELD

The present invention relates to optical switch devices, and in particular to wavelength selective optical switch devices having a plurality of input and output ports.

BACKGROUND OF THE INVENTION

In an optical communication network, optical signals having a plurality of optical channels at individual wavelengths, called "wavelength channels", are transmitted from one location to another, typically through a length of optical fiber. An optical cross-connect module allows switching of optical signals from one optical fiber to another. A wavelength-selective optical cross-connect, or wavelength selective switch (WSS) module, allows reconfigurable wavelength-dependent switching, that is, it allows certain wavelength channels to be switched from a first optical fiber to a second optical fiber while letting the other wavelength channels propagate in the first optical fiber, or it allows certain wavelength channels to be switched to a third optical fiber. An optical network architecture based on wavelength-selective optical switching, which is sometimes referred to as an "agile" optical network architecture, has many attractive features due to the ability to automatically create or re-route optical paths of individual wavelength channels. It accelerates service deployment, accelerates rerouting around points of failure of an optical network, and reduces capital and operating expenses for a service provider, as well as creating a future-proof topology of the network.

Conventional WSS modules have been constructed to switch wavelength channels between one input optical fiber and a few, for example four or eight, output optical fibers. For example, the folded symmetrical 4-f configuration disclosed in U.S. Pat. No. 6,498,872 by Bouevitch et al., and the optional field-flattening optical wedge taught in U.S. Pat. No. 6,760,501 by Iyer et al., both assigned to JDS Uniphase Corporation and incorporated herein by reference, allow construction of WSS modules for performing the abovementioned wavelength channel switching function. Multiport WSS modules are also taught in U.S. Pat. Nos. 6,707,959 by Ducellier et al. and 6,810,169 by Bouevitch, both assigned to JDS Uniphase Corporation and incorporated herein by reference, while a multi-module unit is taught in US Pat. Appl. Pub. No. 20070242953 by Keyworth et al., which is also incorporated herein by reference.

The abovementioned 1×N WSS modules, although useful in the agile optical networks as mentioned above, are limited by having only one input port (or only one output port when used in a reverse direction). One such limitation is related to having wavelength channels at the same wavelength in the same network. Since the wavelengths of all wavelength channels have to be different at any single port to avoid undesired interference, having one input or one output port in a WSS device results in the entire device being incapable of handling more than one "instance" of a wavelength channel. Another limitation is related to reliability and redundancy requirements. Having all the traffic propagating in a single optical fiber connected to the single input or output port of a 1×N WSS lowers the reliability of an optical network, because damage to that single fiber may result in a catastrophic failure of the entire network. Accordingly, there is increasing interest in M×N WSS modules for use in agile optical networks.

Traditionally, M×N WSS were provided by connecting M×1 and 1×N WSS modules, either in series or in parallel. Referring to FIG. 1A, a compound M×N WSS module 100A is shown having a M×1 WSS module 101 and 1×N WSS module 102. The modules 101 and 102 are connected serially with a common optical fiber 103. The combined module 100A has M input ports 104 and N output ports 105. Unfortunately, the WSS 100A is "wavelength-blocking", meaning that it does not allow routing of wavelength channels at the same wavelength, appearing at the different input ports 104. Referring to FIG. 1B, a compound N×N WSS module 100B is shown having 2N 1×N WSS modules 106 interconnected with N fiber bundles 107. The WSS module 100B is "non-blocking", however this is achieved at a very high cost of having to use many 1×N WSS modules 106. Furthermore, both modules 100A and 100B have high insertion loss, since an optical signal has to pass through two modules.

U.S. Pat. No. 6,711,316 by Ducellier, assigned to JDS Uniphase Corporation and incorporated herein by reference, discloses a N×N wavelength cross-connect having two N×K arrays of beam deflectors, wherein K is the number of wavelengths. Unfortunately, the WSS discussed therein is bulky, essentially including two WSS modules connected back-to-back. In addition, it is not readily expandable for a large number of ports. For example, at N=40 ports and K=80 wavelengths, it requires two arrays of 40×80 beam deflectors.

In U.S. patent application Ser. No. 12/367,160 filed Feb. 6, 2009 to Colbourne, which is hereby incorporated by reference, a M×N WSS module requiring significantly fewer beam steering elements (e.g., beam deflectors) is disclosed. Referring to FIG. 2, the M×N WSS 200 is shown having an input fiber array 202 of M input fibers, an input microlens array 204 of M microlenses, a collimating lens 206, a focusing lens 207, each lens having a focal length f, a diffraction grating 208 disposed one focal length f away from the lenses 206 and 207, a roof prism 210, a first micro-electromechanical (MEMS) micromirror array 212 disposed one focal length f away from the lens 207, a switching lens 214, a second MEMS micromirror array 216, and an output fiber array 218 of N output fibers.

In operation, a diverging light beam 221 emitted by a fiber 201 of the input fiber array 202 is collimated by a corresponding microlens of the microlens array 204 to form a spot 222 one focal length f away from the collimating lens 206. Even though the beam 222 is "collimated" at the spot 222, since the beam size is quite small, it continues to diverge, the divergence not illustrated, and is subsequently collimated by the collimating lens 206, which couples it to the diffraction grating 208. The diffraction grating 208 spreads the beam 222 into a plurality of sub-beams, each sub-beam carrying a separate wavelength channel (i.e., termed "wavelength channel sub-beams"). The plurality of wavelength channel sub-beams are dispersed by the diffraction grating in a plane parallel to the YZ plane in FIG. 2. The dispersed wavelength channel sub-beams are coupled by the focusing lens 207, through the roof prism 210 onto the MEMS micromirror array 212. The array 212 has M rows of K micromirrors, where K is the total number of wavelength channels, and is disposed so that each of the micromirrors is illuminated by a particular of the K wavelength channel sub-beams emitted by a particular of the M input fibers. The beam angle of each wavelength channel sub-beam reflected from a corresponding MEMS micromirror is determined by a tilt of the corresponding MEMS micromirror, in dependence upon a control signal, not shown, applied to each MEMS micromirror of the array 212. The switching lens 214 acts as an angle-to-offset converter. More specifically, since the beam angles of individual wavelength channel sub-beams are individually determined by the angle of tilt of corresponding micromirrors of the MEMS micromirror array 212, then the switching lens 214 will direct the wavelength channel sub-beams to fall on predetermined micromirrors of the second MEMS micromirror array 216. The second MEMS micromirror array 216 has N micromirrors, each micromirror being associated with a particular of N output fibers of the output fiber array 218. The role of the second MEMS micromirror array 216 is to couple a wavelength channel sub-beam falling onto its micromirror to the output fiber corresponding to said micromirror. Which wavelength channel sub-beam is coupled depends on the micromirror tilt angle that, in its turn, depends on a control signal, not shown, applied to the micromirror of the array 216. In this way, any one of the K wavelength channel sub-beams in the input fiber 201 is independently switchable into any particular one of the N output fibers, depending upon the individually controllable tilt angles of corresponding MEMS micromirrors of the arrays 212 an 216. Similarly, wavelength channel sub-beams 225 emitted by an input fiber 205 of the array 202 are independently switchable.

Notably, the M×N WSS module taught by Colbourne is particularly useful if only one signal needs to be sent to any one output port, such as when the output ports are directly coupled to receivers or transmitters. One advantage of this optical design is that only M rows of switching elements (instead of M+N rows) are required at the back end, while an N element array of switching elements is required at the front end (in front of the output ports). Accordingly, for an 8×20 WSS with 100 wavelength channels, a total of 820 switching elements (i.e., 8*100+20=820 switching elements) will be required. Compare this with the full cross-connect design taught in U.S. Pat. No. 6,711,316, which would require 28 rows of switching elements at the back end, or a total 2800 switching elements (i.e., 28*100=2800 switching elements).

Unfortunately, the use of the roof prism 210, which offsets light beams impinging onto the MEMS array 212 relative to light beams reflected therefrom so that the optical elements 202 and 204 can be disposed on the opposite side of the optical axis 240 relative to the optical elements 214, 216, and 218 to prevent mechanical interference, significantly increases the bulk of the M×N WSS module.

SUMMARY OF THE INVENTION

A M×N wavelength selective switch (WSS) module of the present invention is capable of independently routing any wavelength channel from any input port to any output port. Advantageously, the M×N WSS includes front-end optics that allow the input beams and output beams to occupy the same space to a great extent. For example, in one embodiment the front-end optics include a beam expander arrangement that provides a common point through which all of the input beams of light pass, and at which a front-end switching array (e.g., a MEMS micromirror array) is positioned. In general, the front-end switching array will be positioned such that the input and output beams are separated via an unused portion of the front end switching array (e.g., using an optical by-pass). Further advantageously, these front-end optics allow both the input and output optical beams to pass closer to the optical axis, thus considerably reducing optical aberrations. In addition, since the input and output beam traverse similar paths throughout the optical train, some aberrations may be cancelled.

In accordance with one aspect of the instant invention there is provide a wavelength selective switch module comprising: a first plurality of ports comprising M ports and a second plurality of ports comprising N ports, at least one of the ports in the first and second pluralities for providing a multiplexed light beam having K wavelength channels, where K, M, and N are integer numbers greater than one; a first beam relayer including first and second elements having optical power, each of the first and second elements having optical power disposed such that light transmitted to or from the first plurality of ports passes through a common point, and is substantially focused at a first focal plane, the common point optically disposed between the first and second elements having optical power, the first focal plane spatially separated from the common point; a wavelength dispersive element for spatially separating the multiplexed light beam into a plurality of wavelength channel sub-beams; a first switching array including M rows, each row including K switching elements, each switching element in the first switching array for redirecting a different wavelength channel sub-beam incident thereon at a predetermined angle; a second beam relayer for relaying light beams between the first focal plane, the wavelength dispersive element, and the first switching array, the second beam relayer including at least one element having optical power, each of the wavelength dispersive element and the first switching array disposed substantially one focal length away from the at least one element having optical power; and, a second switching array including N switching elements, each switching element in the second switching array for redirecting wavelength channel sub-beams incident thereon at a predetermined angle, the second switching array including an optical by-pass disposed at the common point.

In accordance with one aspect of the instant invention a wavelength selective switch module comprising: a first plurality of ports; a first beam relayer including first and second elements having optical power, the first beam relayer for forcing light beams launched from or to the first plurality of ports to intersect at a common point, the first and second elements having optical power disposed such that light transmitted from the first plurality of ports is substantially focused at a first plane, the common point optically disposed between the first and second elements having optical power, the common point spatially separated from the first plane; a wavelength dispersive element for spatially separating a multiplexed beam of light into a plurality of wavelength channel sub-beams; a first switching array including a first plurality of switching elements, each switching element in the first switching array for redirecting a different wavelength channel sub-beam transmitted from the wavelength dispersive element at a predetermined angle; a second beam relayer for relaying light between the first plane, the wavelength dispersive element, and the first switching array, the second beam relayer including at least one element having optical power; and a second switching array including a second plurality of switching elements, each switching element in the second switching array for redirecting light to or from a second other plurality of ports; wherein the second switching array is disposed about the common point such that light propagating in a first propagating direction towards the first plane circumvents the switching elements in the second switching array, whereas light propagating in a second opposite propagating direction is redirected by the switching elements in the second switching array in dependence upon an angle at which it was redirected away from the first switching array.

In one embodiment, the input ports and output ports are tips of optical fibers or optical waveguides, which for example, are part of an input or output fiber array.

BRIEF DESCRIPTION OF THE DRAWINGS

Further features and advantages of the present invention will become apparent from the following detailed description, taken in combination with the appended drawings, in which:

FIG. 1A is an optical circuit of prior-art multi-input port, multi-output port wavelength selective switch;

FIG. 1B is an optical circuit of another prior-art multi-input port, multi-output port wavelength selective switch;

It will be noted that throughout the appended drawings, like features are identified by like reference numerals.

DETAILED DESCRIPTION OF THE INVENTION

Figure 3A:
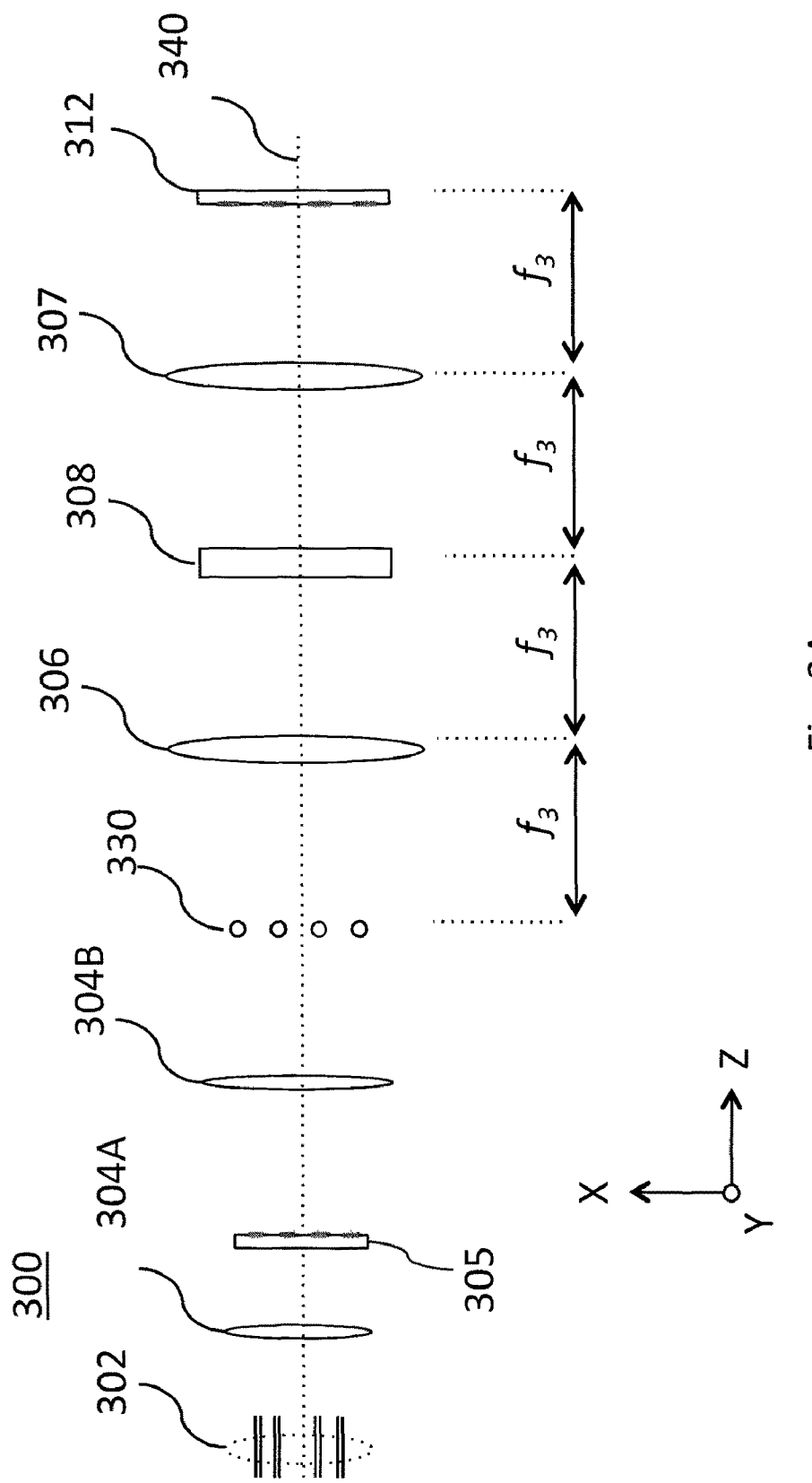
FIG. 3A is a schematic diagram showing a side view of an M×N WSS in accordance with one embodiment of the instant invention.

Referring to FIG. 3A, an M×N wavelength selective switch (WSS) 300 in accordance with one embodiment of the instant invention is shown. The WSS 300 includes an input fiber array 302 of M input fibers, a first lens 304A, a second lens 304B, a third lens 306, a fourth lens 307, a wavelength dispersive element 308, a first switching array 312, a second switching array 305, and an output fiber array of N output fibers (not shown).

The input fiber array 302 includes a plurality of input optical fibers. In one embodiment the input fiber array 302 is a micro collimator array (MCA) including an array of microlenses for expanding and substantially collimating the beams emitted from the plurality of input optical fibers, to provide more efficient switching. In this case, each microlens is typically disposed adjacent to the end of the corresponding optical fiber at the appropriate distance.

The lenses 304A, 304B, 306, and 307 are elements having optical power. For example, in one embodiment each lens 304A, 304B, 306, and 307 is a collimating/focusing lens such as a spherical lens. The lenses 304A, 304B, 306, and 307 are used to relay light beams from the input ports at the input fiber array 302 (i.e., at the front end of the WSS) to the first switching array 312 (i.e., at the back end of the WSS).

The first lens 304A has a focal length $f_1$, whereas the second lens 304B has a focal length $f_2$. While the focal lengths of the first 304A and second 304B lenses may be the same, in practice they will often differ and will be arranged to form a beam expander 304A/304B that increases the separation between the input beams provided by the fiber array 302 (e.g., 127 micron pitch) to the separation between rows in the first switching array 312 (e.g., 2000 micron pitch). The third 306 and fourth 307 lenses have a focal length of $f_3$.

Figure 3B:
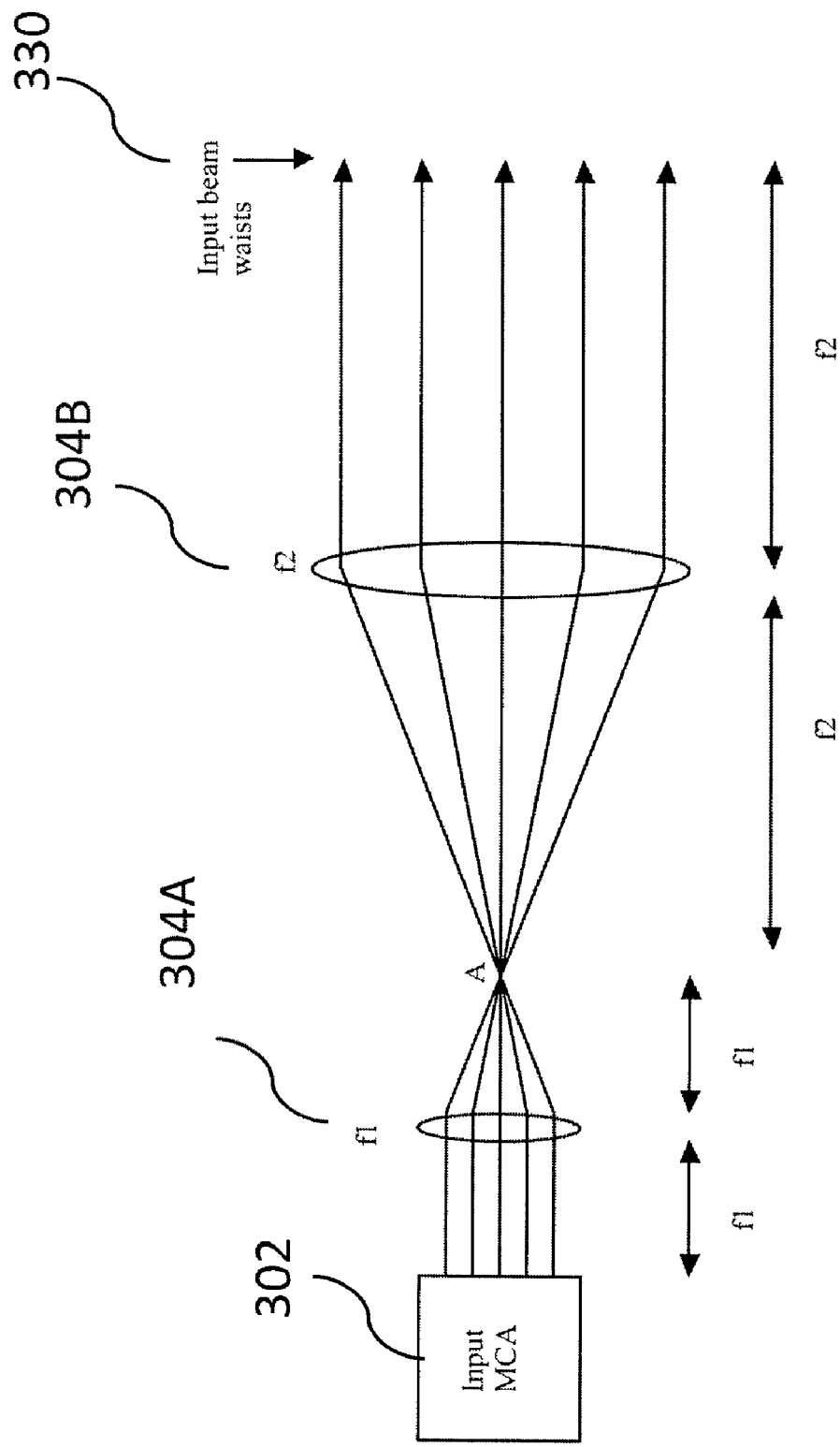
FIG. 3B shows the optical paths in the front end optics of the WSS illustrated in FIG. 3A, for the forward propagating direction.

Referring also to FIG. 3B, the first 304A and second 304B lenses are arranged such that all of the input beams, which emerge substantially parallel from the input fiber array 302, are transmitted through the first lens 304A and cross at a common point (i.e., point "A"). After passing through the second lens 304B, the input beams, which are divergent even with the use of the optional microlens array (not shown), will form Gaussian beam waists 330 one focal length $f_3$ away from the third lens 306. Notably, arranging the first 304A and second 304B lenses such that all of the input beams cross at one point (i.e., point A) allows the input beams to occupy the same physical space as the output beams for most of the optical train. More specifically, it provides a position at which the second switching array 305 can be provided to separate the input and output optical beams.

Figure 3C:
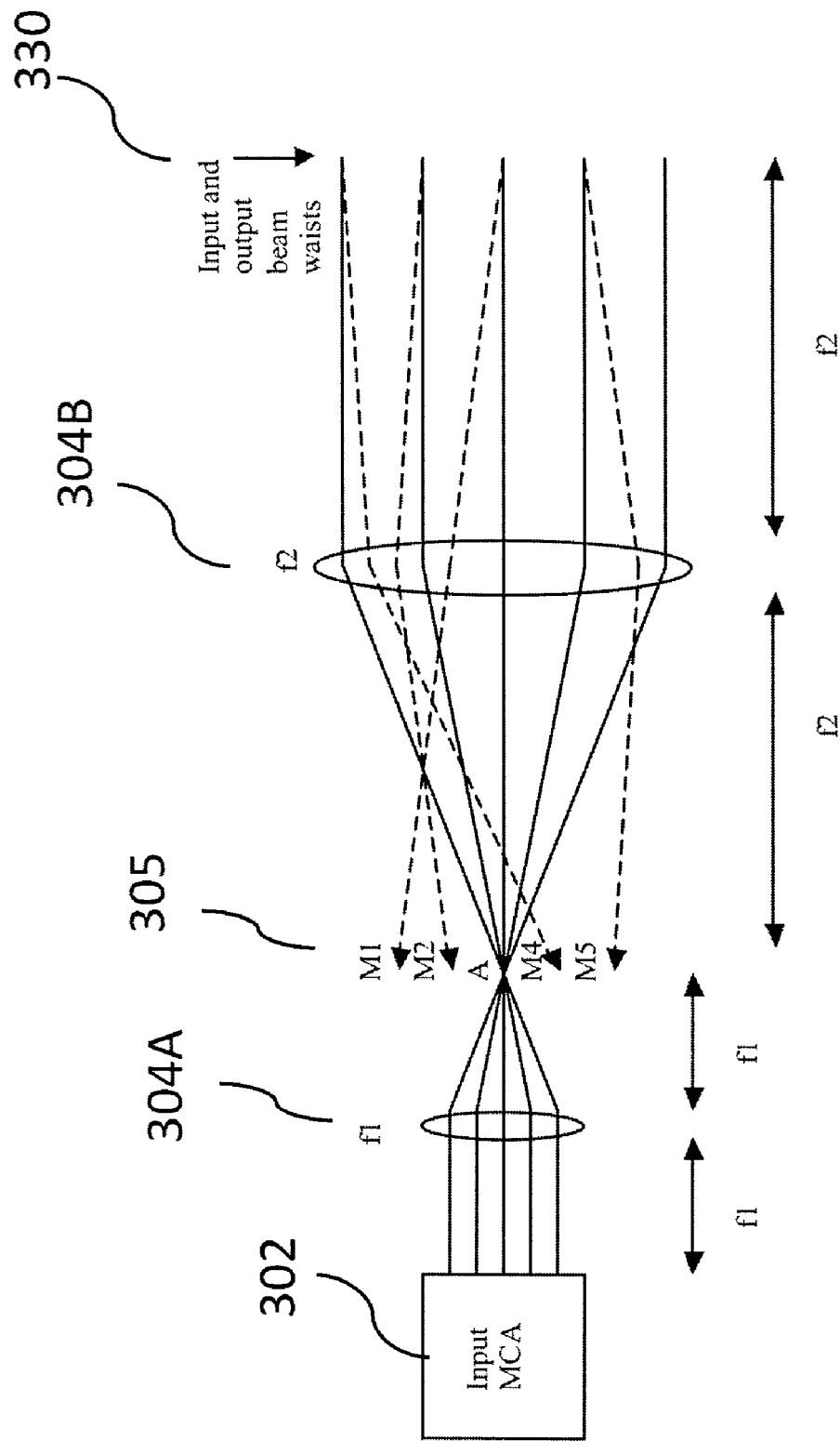
FIG. 3C shows the optical paths in the front end optics of the WSS illustrated in FIG. 3A, for the backward propagating direction.

Referring to FIG. 3C, it is clear that while the input beams (e.g., illustrated with solid lines) all pass through point A, the output beams (e.g., illustrated with dashed lines) having been reflected with some predetermined non-zero angle from the first switching array 312 will not pass through point A, but rather, will pass above or below point A. The switching elements of the second array 305 are disposed at positions M1, M2, M4, and M5 to redirect the output beams so that they are efficiently coupled to the output fiber array (not shown). Accordingly, as long as the second switching array 305 includes a by-pass at the central position A, there will be no physical conflict between the input beams and output beams. For example, in the embodiment illustrated in FIG. 3C, the by-pass at point A is positioned to correspond to output port 3, which is sacrificed to make the separation of input and output beams possible. In one embodiment the by-pass is a gap in the switching array through which the input beams pass. In embodiments the by-pass is a reflector set at a fixed angle.

Each switching array 305 and 312 includes a plurality of switching elements for independent routing of the individual wavelength channel sub-beams. In one embodiment, at least one of the switching arrays 305 and 312 is a tiltable mirror array having a plurality of individually controllable mirrors fabricated using a conventional semiconductor-based microelectromechanical system (MEMS) technique. In another embodiment, at least one of the switching arrays 305 and 312 is a liquid crystal display (LCD) device having a plurality of individually controlled pixels. For example, one device that is suitable for use as the LCD switching array is the light steering array using tunable phase delay elements taught in U.S. Pat. No. 7,626,754 to Reimer, which is incorporated herein by reference. Another device that is suitable for use as the LCD switching array is the optical phased-matrix coupling device taught in US Pat. Appl. No. 20060067611, which is hereby incorporated by reference. In this case, each switching element corresponds to a region on an LCoS representing a plurality of independently addressable pixels. The plurality of independently addressable pixels in each region is manipulated in a predetermined manner so as to manipulate the phase front of the wavelength channel sub-beams and thus redirect the same. Since LCD devices are polarization sensitive, these LCD-based switching arrays will typically require polarization diversity optics disposed at the position of each beam waist (e.g., at spot 330). For example, in one embodiment the polarization diversity optics include a birefringent walk-off crystal coupled to a halfwave plate. Polarization diversity optics are well known in the art, and are discussed in further detail in U.S. Pat. No. 6,498,872.

The first switching array 312 has M rows of K switching elements, where K is the total number of wavelength channels. The first switching array 312 is disposed such that each of the switching elements is illuminated by one of the K wavelength channel sub-beams emitted by one of the M input fibers. The beam angle of each wavelength channel sub-beam reflected from the corresponding switching element is determined in dependence upon a control signal applied thereto (e.g., to tilt the corresponding MEMS micromirror or to change the phase of the tunable liquid crystal phase delay switching elements).

The second switching array 305 has N switching elements, each switching element being associated with one of the N output fibers of the output fiber array (not shown). The second switching array 305 couples a wavelength channel sub-beam falling onto its switching elements to the output fiber corresponding to said switching element. Which wavelength channel sub-beam is coupled depends on the reflected angle provided by the switching element in array 312, which in turn, depends on a control signal, not shown, applied to the same. In this way, any one of the K wavelength channel sub-beams emitted from a first input fiber 301 is independently switchable into any particular one of the N output fibers, depending upon the individually controllable tilt angles of corresponding switching elements of the arrays 312 and 305.

In embodiments wherein the switching arrays 305 and 312 are LCD-based the number of switching elements may double. For example in one embodiment, a switching element is provided for each sub-beam provided by the polarization diversity optics.

In embodiments wherein the switching arrays 305 and 312 are MEMS mirror arrays, the mirrors may tilt about one or two axes. For example, in one embodiment the second switching array 305 is a MEMS array wherein the mirrors are tiltable about a single axis, whereas the first switching array 312 is a MEMS array wherein the mirrors are tiltable about two orthogonal axes. Providing 2D tilting at the back end of the WSS advantageously allows "hitless" switching, thus improving isolation between wavelength channels. For example, consider a wavelength channel transmitted from a first input port being switched from a first output fiber to a third output fiber. As the corresponding MEMS mirror rotates about the first axis to redirect the sub-beam from first to the third fibers, the sub-beam will coupled briefly to the second intermediate output fiber. By rotating the corresponding MEMS mirror about a second axis, orthogonal to the first, this undesirable effect is mitigated.

The wavelength dispersive element 308 separates multiplexed beam of lights emitted from the input array 302 into a plurality of sub-beams, each sub-beam carrying a separate wavelength channel. These wavelength channel sub-beams are spread by the dispersive element in a plane parallel to the YZ plane in FIG. 3A. In general, the wavelength dispersive element 308 will be disposed substantially one focal length $f_3$ away from lenses 306 ad 307. In one embodiment, the dispersive element 308 is a high efficiency, high dispersion diffraction grating oriented such that the wavelength dispersion direction is out of the page. In other embodiments the dispersive element 308 is any wavelength dispersive element for spatially separating individual wavelength channel sub-beams, such as a prism, an Echelle grating, or a grism, for example.

The operation of WSS 300 is further discussed with reference to FIGS. 4A and 4B, which show the propagation of optical beams in the forward propagating and backward propagating directions, respectively.

Figure 4A:
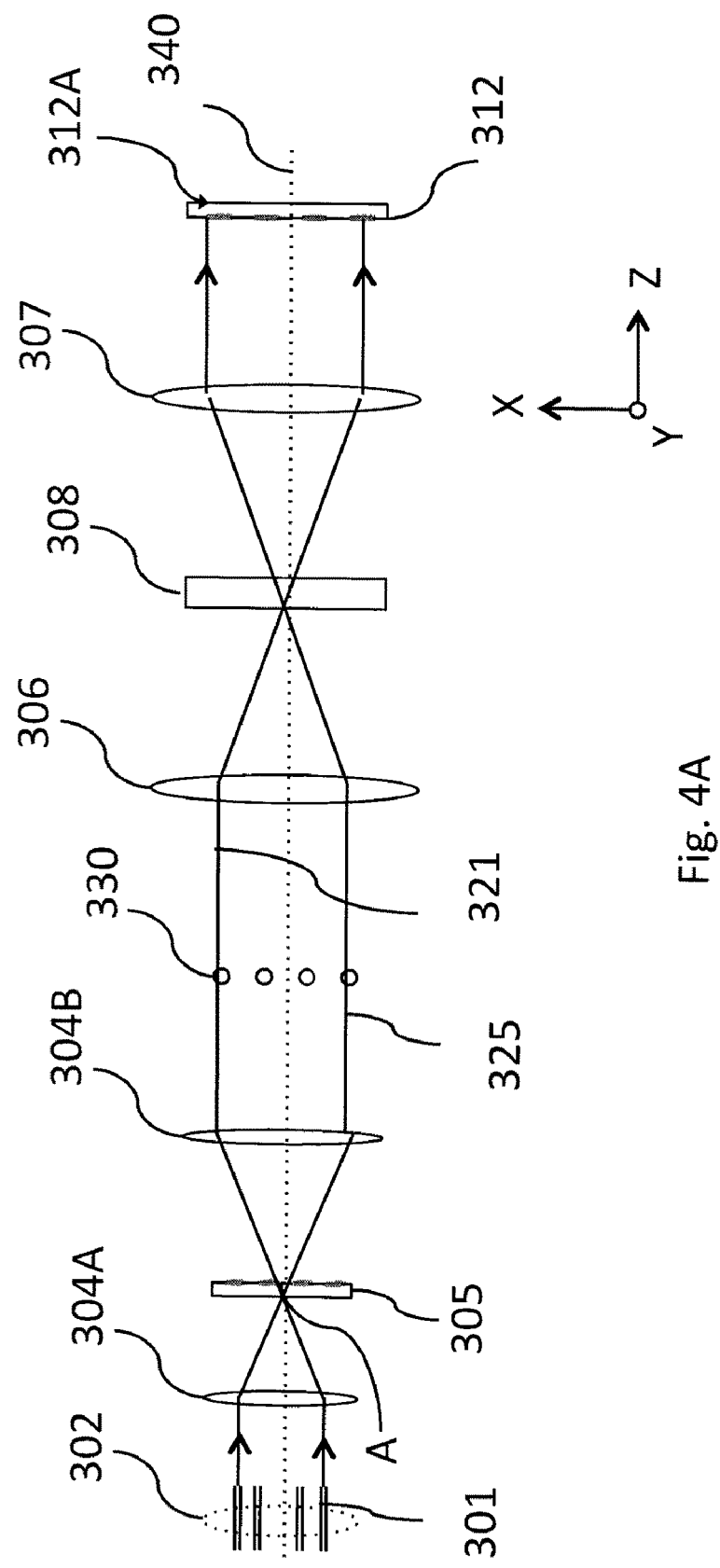
FIG. 4A shows the optical paths in the WSS illustrated in FIG. 3A, for the forward propagating direction.

Referring to FIG. 4A, a diverging light beam 321 emitted by a fiber 301 in the input fiber array 302 is substantially collimated by a microlens in the optional microlens array (not shown) and is transmitted through the beam expander arrangement 304A/304B to form a spot at 330 at a plane one focal length $f_3$ away from the lens 306. The lens 306 directs the input beam 321 to the wavelength dispersive element 308, which separates the input beam 321 into a plurality of sub-beams, each sub-beam carrying a separate wavelength channel. As discussed above, the wavelength dispersive element 308 is oriented such that the plurality of wavelength channel sub-beams are spread in a plane parallel to the YZ plane. The dispersed wavelength channel sub-beams are coupled by the lens 307 to the switching array 312. More specifically, each wavelength channel sub-beam from the input beam 321 is incident on a different switching element in one row 312A of the array 312. Similarly, input beams emitted from different fibers in the array (e.g., diverging light beam 325) will pass through the same optics via a different spot, but in the same plane as spot 330, and will be transmitted to a different row of switching elements.

Figure 4B:
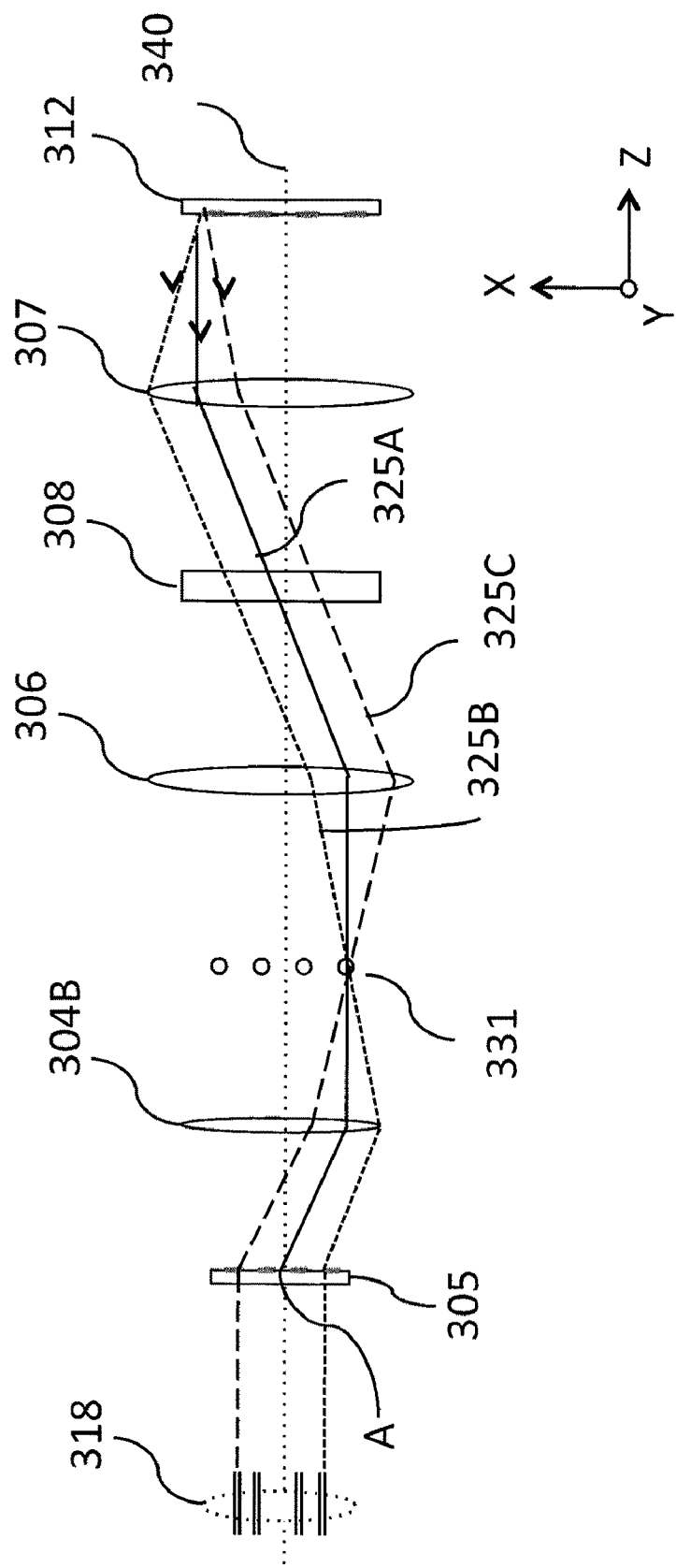
FIG. 4B shows the optical paths in the WSS illustrated in FIG. 3A, for the backward propagating direction.

Referring to FIG. 4B, the wavelength channel sub-beams are reflected from the corresponding switching elements such that they pass through the same optics in the reverse order (e.g., the wavelength channel sub-beams corresponding to input beam 325 and reflected with the same angle are recombined by the dispersive element 308). In general, each sub-beam will be reflected with an angle dependent on a control signal applied to the corresponding switching element. Since the switching array 312, lens 307, dispersive element 308, lens 306, and the plane including the beam waists (e.g., plane common to spots 330 and 331), are disposed one focal length $f_3$ away from each other, any wavelength channel sub-beam originating from input beam 225 will be focused at the same spot 331, regardless of the tilt of the corresponding switching element. While each spot within the plane common to spots 330 and 331 is common for all the wavelength channel sub-beams emitted by the same input fiber or input port (e.g., tip of the fiber), the beam angle of the reflected input beams 325A, 325B, 325C at point 331 will be determined by the beam angle provided by the corresponding switching elements in the array 312. For example, reflected sub-beams 325A, 325B, and 325 C illustrate different beam angles provided with the same switching element (e.g., or provided by different switching elements within the same row). Notably, reflected beam 325B corresponds to the undesirable case where the switching element provides retro-reflection causing the reflected beam to repass through the by-pass in the second switching array 305. In contrast, the reflected beams 325A and 325C are transmitted to spot 331 at an angle, and are redirected by lens 304B to the second switching array 305 where they are reflected by the corresponding switching elements to the output ports 318. Notably, in the reverse propagating direction the lens 304B functions as an angle-to-offset converter, wherein the beam position on the switching array 305 is determined by beam angle, and only beam angle, of the wavelength channel sub-beams at the plane common to spots 330 and 331. Since the beam angles of individual wavelength channel sub-beams are individually determined by the reflection angle provided by first switching array 312, the wavelength channel sub-beams emitted by the input fibers can be individually directed to fall on the corresponding switching element in the second switching array 305. In this way, any one of the K wavelength channel sub-beams from an input fiber is independently switchable into any particular one of the N output fibers, depending upon the individually controllable tilt angles of corresponding switching elements in arrays 312 and 305.

In the optical arrangement illustrated in FIGS. 3A, 4A, and 4B, the second switching array 305 redirects the reflected beams directly towards the plurality of output ports 318 (e.g., the tips of a plurality of output optical fibers). However, in other embodiments, a beam reducer formed from two lenses is provided to couple the output beams to the output ports.

Figure 4C:
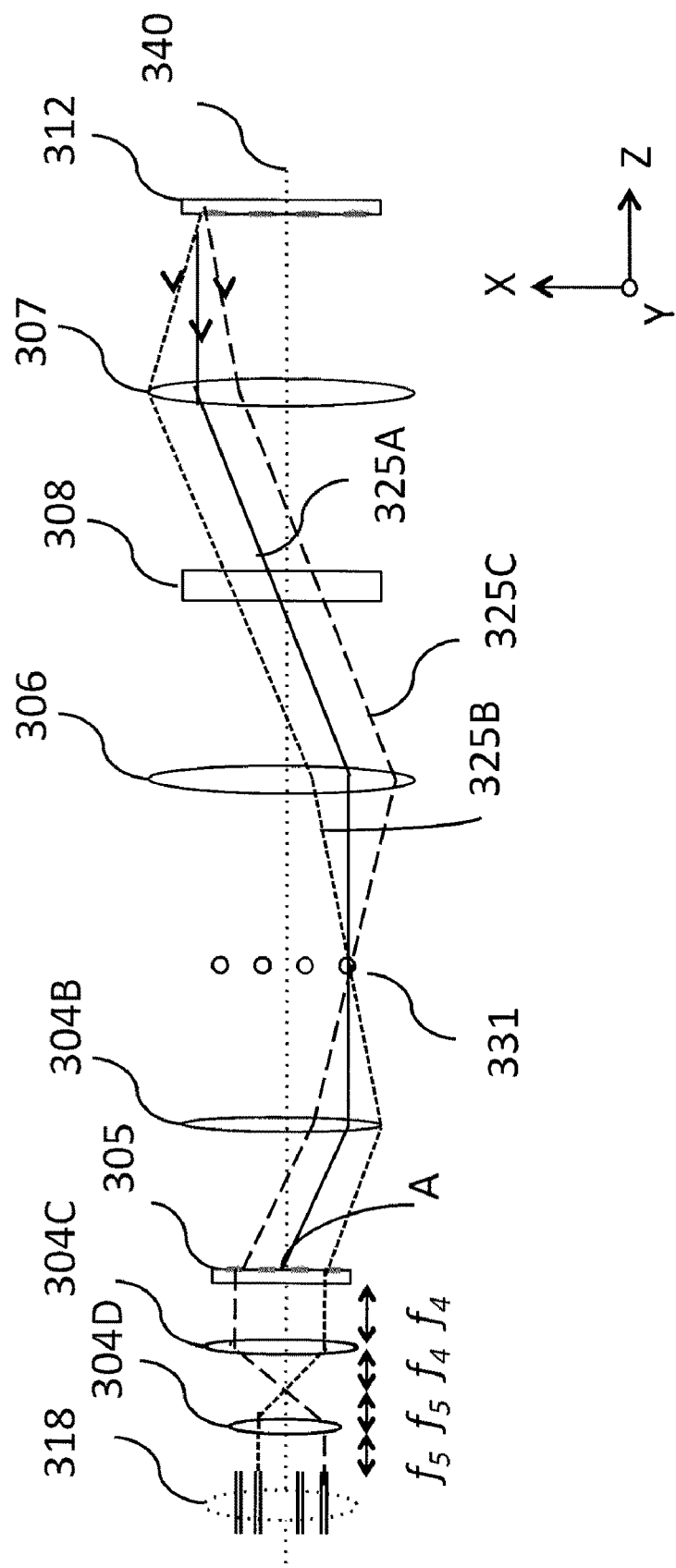
FIG. 4C shows the optical paths in a WSS in accordance with another embodiment of the instant invention, for the backward propagating direction.

Referring to FIG. 4C, which shows the backward propagating optical paths of an M×N wavelength selective switch (WSS) in accordance with another embodiment of the instant invention, a beam reducer reduces the separation between output beams transmitted from the second switching array 305 to match the pitch of the output fiber array 318 (e.g., an output MCA). More specifically, the beam reducer includes first 304C and second 304D elements having optical power, which for exemplary purposes are illustrated as collimating/focusing lens having focal lengths $f_4$ and $f_5$, respectively.

Figure 5A:
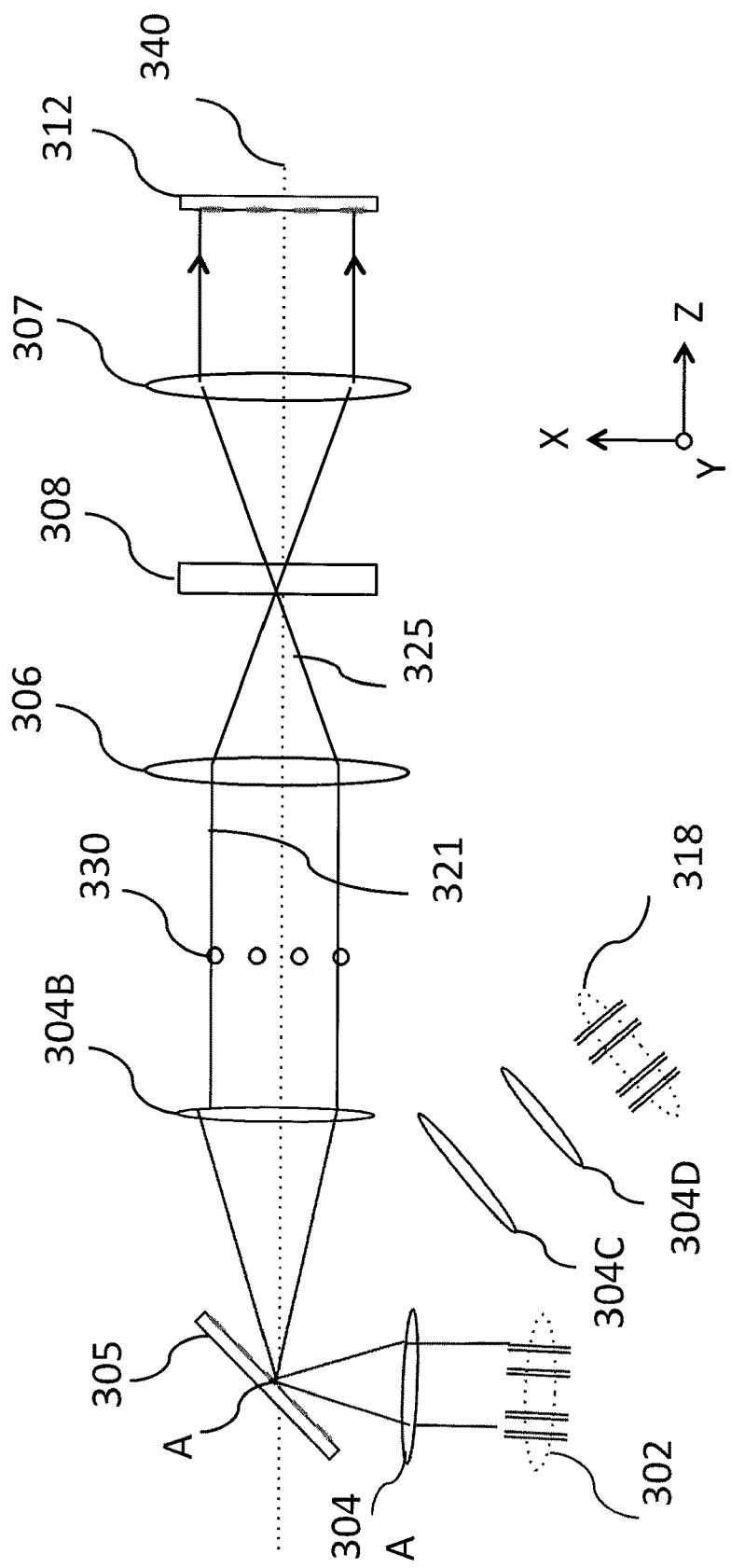
FIG. 5A is schematic diagram showing a side view of an M×N WSS in accordance with one embodiment of the instant invention, including the input optical paths for light beams emitted from two different input optical fibers.
Figure 5B:
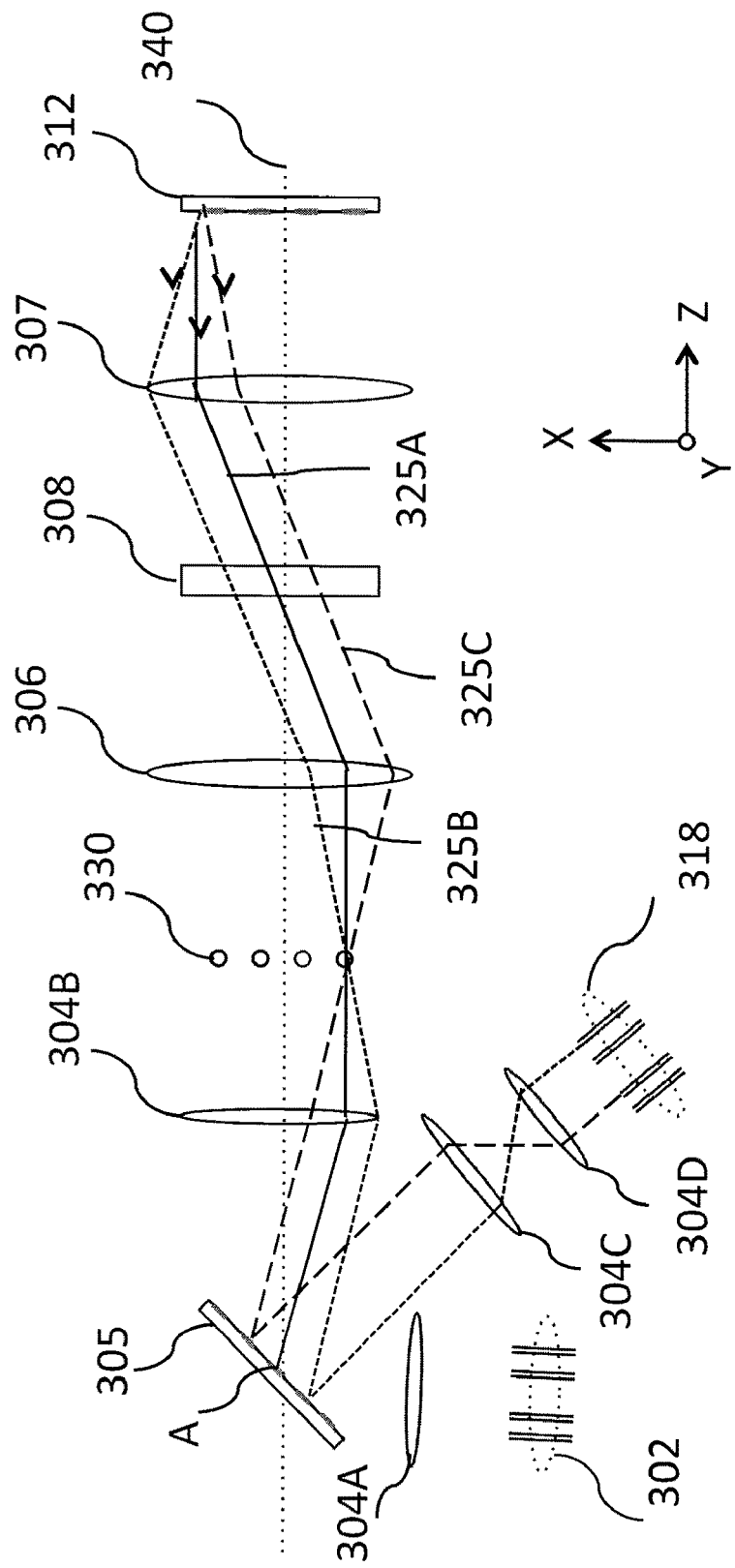
FIG. 5B is schematic diagram showing output optical paths for light beams reflected from the backend optics of the WSS illustrated in FIG. 5A, with different angles.

Referring to FIGS. 5A and 5B, an M×N wavelength selective switch (WSS) 500 in accordance with one embodiment of the instant invention is shown. In general, the optical arrangement is similar to that provided in FIG. 4C, wherein the lenses 304C and 304D are collimating/focusing lenses arranged to form another beam expander/reducer that is used to reduce the beam size and pitch to match the output fiber array 318 (e.g., an output MCA), except that the front-end optics (e.g., input ports 302, output ports 318, first beam expander/reducer 304A/304B, and second beam expander reducer 304C/304D) are arranged differently. More specifically, the front-end optics are arranged to advantageously reduce the reflection angles required by the front end switching array 305.

Figure 6A:
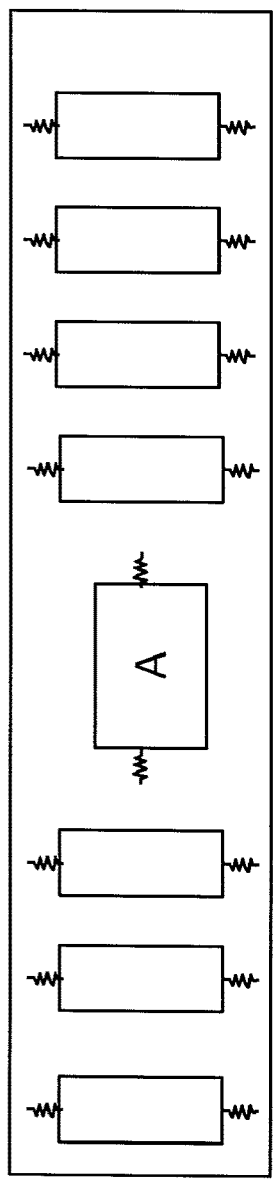
FIG. 6A is schematic diagram showing one embodiment of the front end switching array.
Figure 6B:
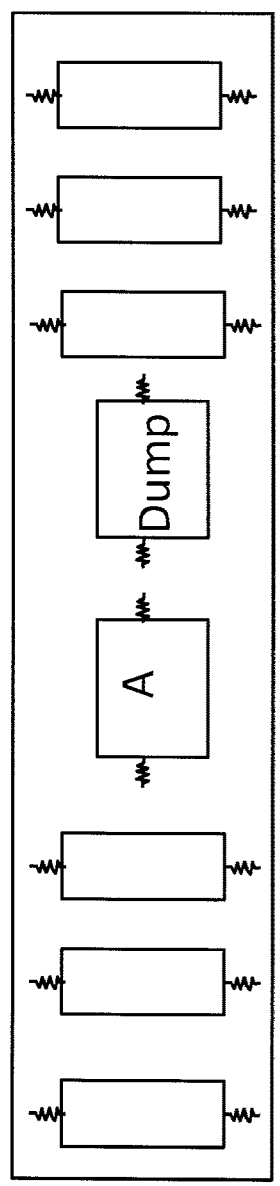
FIG. 6B is schematic diagram showing another embodiment of the front end switching array.
Figure 6C:
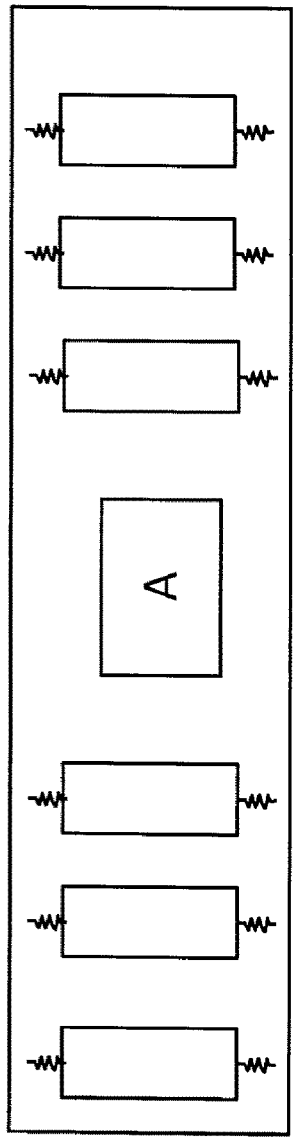
FIG. 6C is schematic diagram showing another embodiment of the front end switching array.
Figure 6D:
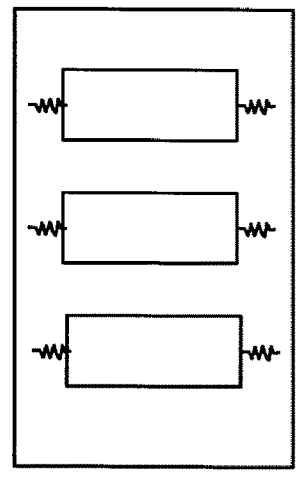
FIG. 6D is schematic diagram showing another embodiment of the front end switching array.
Figure 6D:
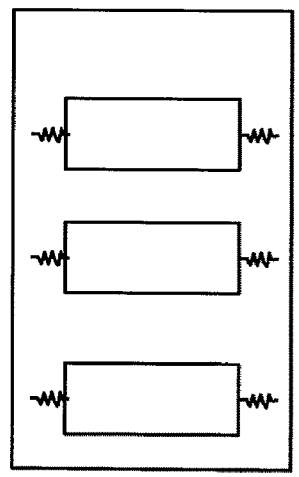

Referring to FIGS. 6A, 6B, 6C, and 6D there is shown four different embodiments of the switching array 305. In each embodiment, the switching array 305 includes a plurality of MEMS mirrors that are rotatable about axes parallel to the Y axis. In general, the plurality of MEMS mirrors are tilted to redirect light beams incident thereon towards the beam reducer 304C/304D along substantially parallel optical paths such that they are redirected to the corresponding output fiber in array 318. The switching array 305 also includes a by-pass that is positioned at point A. In FIG. 6A, the by-pass is a micromirror that is rotated at a fixed angle such that it redirects input beams towards the first switching array 312 in the forward propagating direction. The fixed angle will be dependent on the orientation of the switching array 305 and the position of the input/output fibers. In FIG. 6B, the switching array 305 includes a dump in addition to the plurality of MEMS mirrors and the by-pass mirror. In this embodiment, the dump is a micromirror that is rotated about the same axis as the by-pass mirror at another fixed angle. In general, this angle will be selected such that unwanted wavelength channels can be directed away from the input and output ports via the dump mirror and lost within the system. The embodiments illustrated in FIGS. 6A and 6B are suitable for the optical configuration illustrated in FIGS. 5A and 5B. In FIG. 6C, the by-pass is a gap within the MEMS array. More specifically, the MEMS array includes a window through which the input beams can pass without impinging on a switching element of the array. In FIG. 6D, the MEMS array is provided in two physically separate sections such that the by-pass is provided between the two sections. The embodiments illustrated in FIGS. 6C and 6D are suitable for the optical configuration illustrated in FIG. 4A. In other embodiments (not shown), the second switching array 305 includes a plurality of tunable liquid crystal phase delay elements that are arranged similarly the micromirrors illustrated in FIGS. 6A-6D. Notably, the optical by-pass and dump are depicted close to the center of the 7 and 6 switching arrays for illustrative purposes only. In other embodiments, the by-pass and/or dump will be positioned elsewhere within the array (e.g., at the end of the array), which may include fewer or more switching elements. For example, in one embodiment the switching arrays will include sufficient switching elements to provide arbitrary switching between 8 inputs and 20 outputs (i.e., M=8 and N=20), for about 100 wavelength channels.

Figure 2:
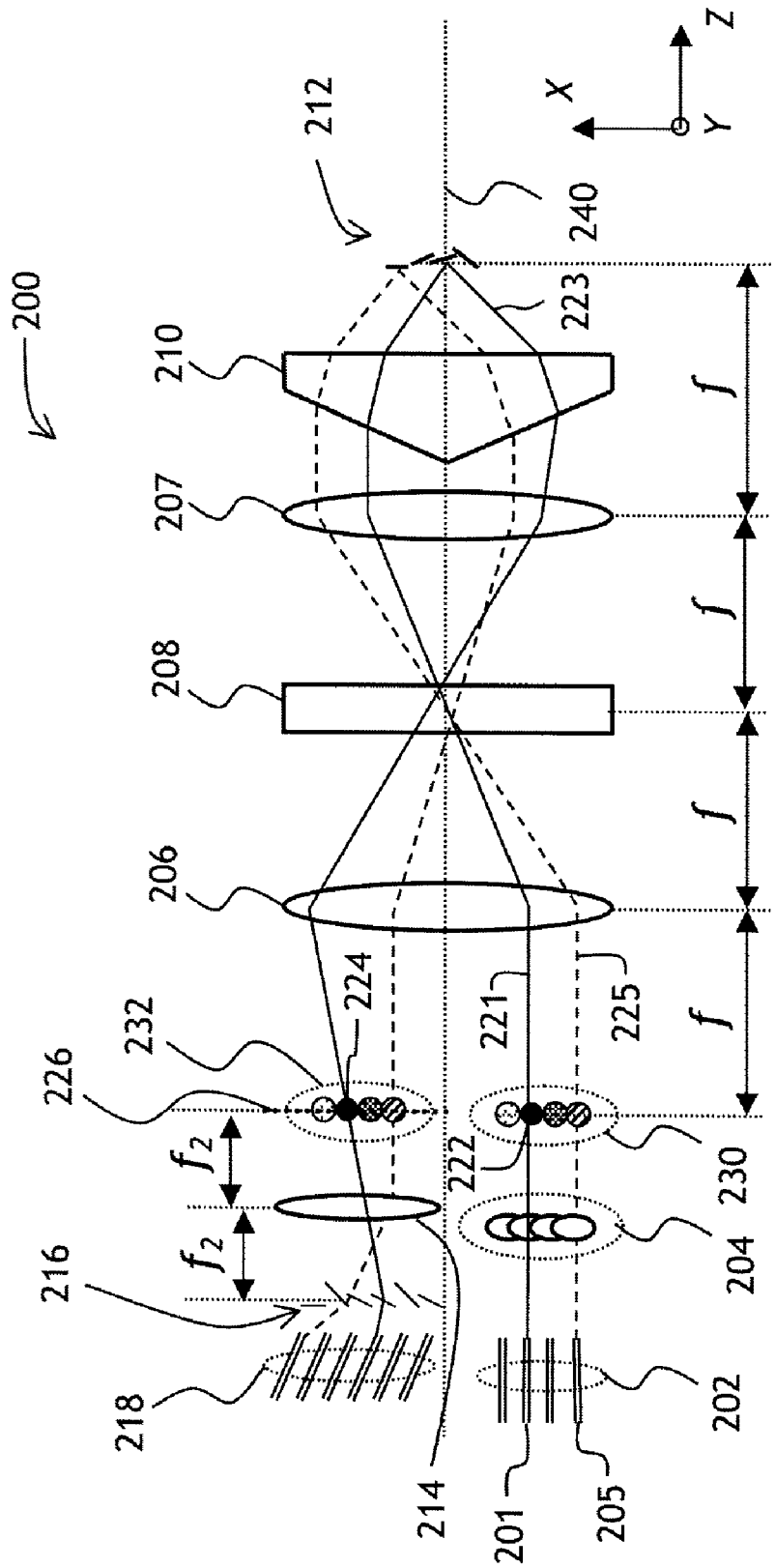
FIG. 2 is an optical diagram of an improved M×N wavelength selective switch (WSS)

In each of the above-described embodiments, the front end optics (e.g., the beam expander 304A/304B and switching array 305) allow the input and output beams to occupy the same physical space through most of the optical train. For example, both the input and output beams form Gaussian waists at the same spot (i.e., at the focal plane common to spot 330 and 331) and in many instances actually cross one another. Allowing the input and output beams to forms beam waists at the same spot (e.g., compare FIG. 3C to FIG. 2, wherein the input and output beam waists are spatially separated such that they are disposed on opposite sides of the optical axis) may reduce the number of components required. For example, the same polarization diversity optics could be used in the forward and backward propagating directions. In addition, the front-end optics obviate the need for microlens array 204, roof prism 210, and switching lens 214 illustrated in FIG. 2, further reducing the number of optical elements required. Since the roof prism 210, which is used to physically separate the input and output beams, is not used, this optical configuration is also less bulky (e.g., is shorter). Furthermore, the front-end optics provide a practical arrangement, wherein a standard FAU (fiber array unit) with 127 micron fiber pitch is readily used. The beam reducer 304C/304D, which is disposed between the switching array 305 and the output fibers 318, advantageously allows the switching array 305 to provide only +/−1.5 degrees tilt angles, compared to an 8 degree tilt angle if the switching array was placed directly in front of the output fiber array.

Since the input and output optical paths occupy substantially the same space and use the same optical elements this design reduces significantly optical aberrations. In particular, optical aberrations are considerably reduced because the optical beams pass closer to the optical axis than they do in the WSS illustrated in FIG. 2. In addition, since the input and output beams traverse similar paths through the optical train some aberrations will be cancelled (e.g., conical distortions arising from striking the diffraction grating at an oblique angle).

In the above-described embodiments, the lenses 304A, 304B, 304C, 304D, 306, and 307 are illustrated and described as simple collimating/focusing lenses. However, in other embodiments, one or more of these lenses may be replaced with another element having optical power, such as a collimating/focusing mirror, as will be understood by those skilled in the art. In general, each combination of the first 304A and second 304B lenses, the third 304C and fourth 304D lenses, and the collimating lenses 306/307, form a beam relay system (i.e., a beam relayer). Optionally, each of these beam relayers is provided with a single element having optical power. For example, in one embodiment one or more of the lens combinations is replaced with a single concave mirror.

Figure 7A:
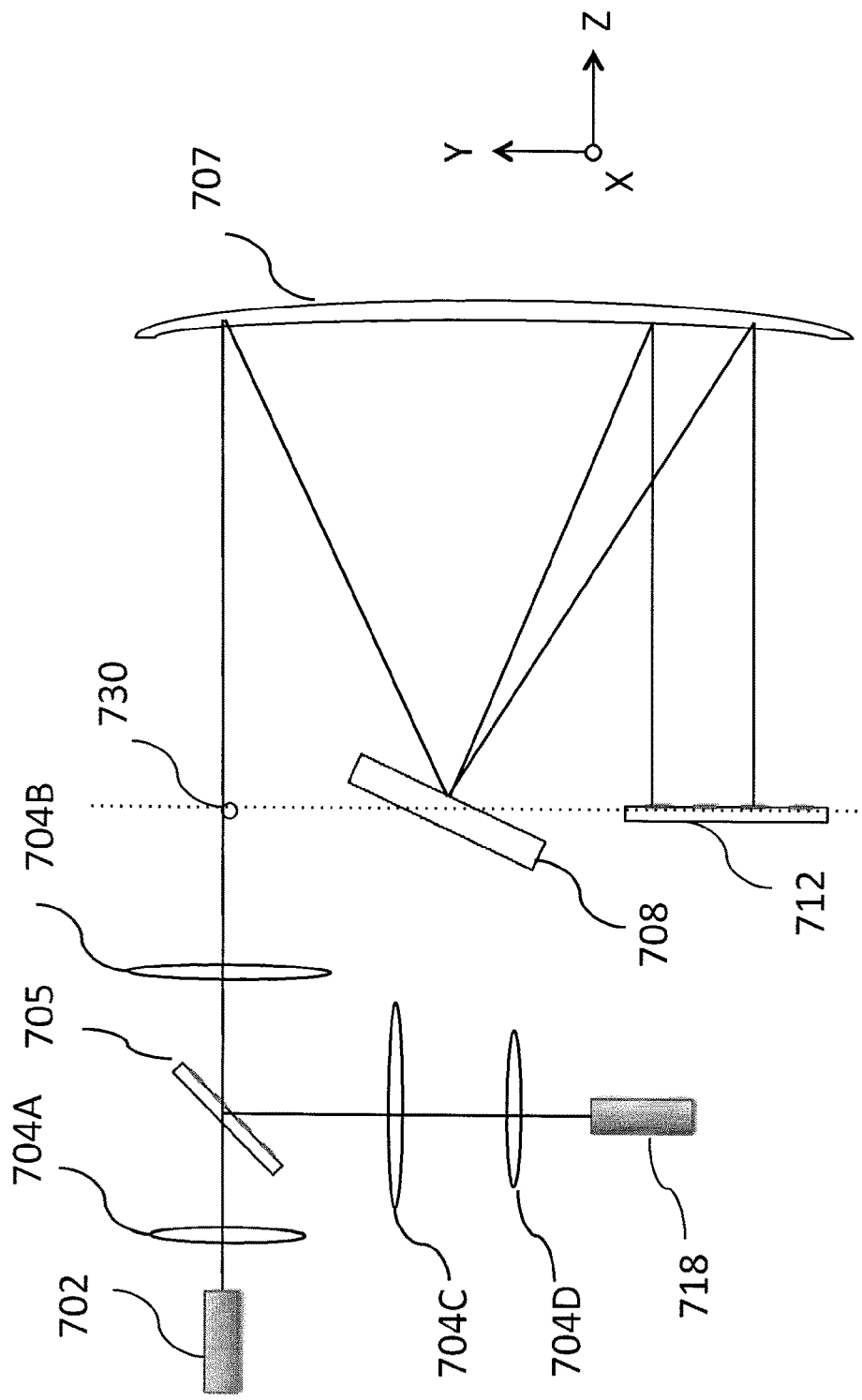
FIG. 7A is a plan view of an M×N WSS in accordance with another embodiment of the instant invention.

Turning now to FIG. 7a, there is shown an embodiment of a M×N WSS in accordance with another embodiment of the instant invention. The WSS includes an input fiber array unit (FAU) 702, first lens 704A, a second lens 704B, a concave mirror 707, a diffraction grating 708 disposed on an optical axis of the concave mirror 707, a first switching array 712, a second switching array 705, a third lens 704C, a fourth lens 704D, and an output FAU 718. The elements 702, 704A, 704B, 708, 712, 705, 704C, 704D, 718 correspond to elements 302, 304A, 304B, 308, 312, 305, 304C, 304D, 318, respectively, discussed with reference to FIGS. 3A to 3C The single concave mirror 707 provides the same functionality as lenses 306 and 307.

In operation, a multiplex beam of light emitted from an input fiber in the FAU 702 is transmitted to the first lens 704A, through the optical bypass in switching array 705, to the second lens 704B, and is focused on the focal plane f of the concave mirror 707 at 730. Since the dispersive element 708 and switching array 712 are also disposed at the focal plane of the concave mirror 707, this configuration forms a 4f arrangement similar to that illustrated in FIG. 3A. Accordingly, the input beam focused at spot 730 will propagate to a first end of the concave mirror 707 where it is reflected to the dispersive element 708. The dispersive element 708 separates the input beam into a plurality of sub-beams, each sub-beam carrying a separate wavelength channel. As illustrated in FIG. 7A, the dispersive element 708 is oriented such that the plurality of wavelength channel sub-beams are spread in a plane parallel to the YZ plane. The dispersed wavelength channel sub-beams are coupled by the second opposite end of the concave mirror 707 to the switching array 712. More specifically, each wavelength channel sub-beam is incident on a different switching element in one row of the array 712.

Each switching element reflects each wavelength channel sub-beam with a predetermined angle such that they pass through the same optics in the reverse order. The wavelength channel sub-beams that are reflected with the same angle will return to spot 730 with the same angle and will be directed to the same output port. Any wavelength channel that is reflected with a different angle will be directed to the spot 730 with a different angle, and thus will be reflected by a different switching element on array 705 and directed to a different output port. In this way, any one of the K wavelength channel sub-beams from an input fiber is independently switchable into any particular one of the N output fibers, depending upon the individually controllable tilt angles of corresponding switching elements in arrays 712 and 705.

Figure 7B:
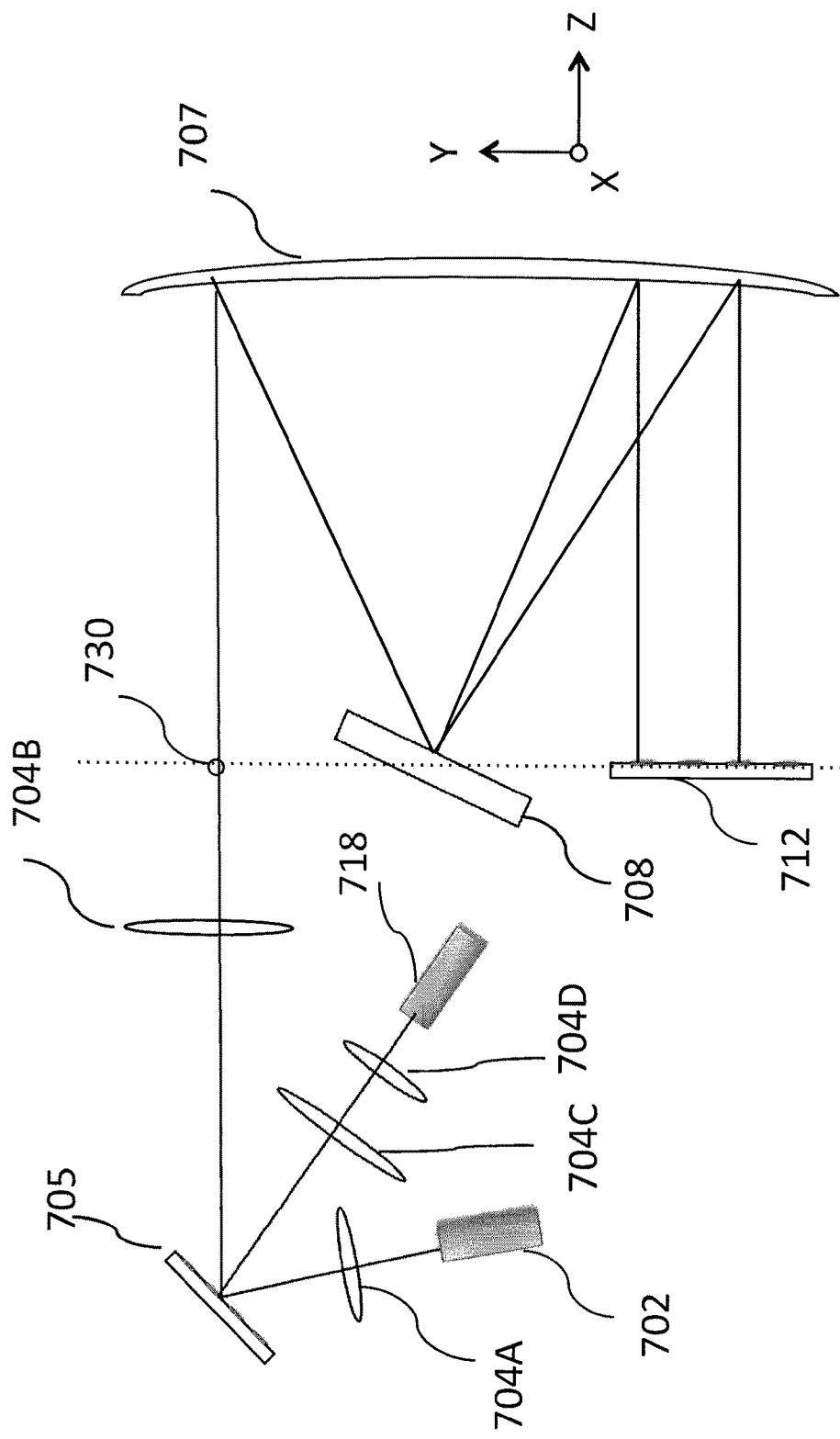
FIG. 7B is a plan view of an M×N WSS in accordance with yet another embodiment of the instant invention.

In the embodiment illustrated in FIG. 7A, the by-pass in switching array 705 is illustrated as a gap in the array, as for example, illustrated in FIGS. 6C and 6D. Turning now to FIG. 7b, there is shown an embodiment of a M×N WSS in accordance with another embodiment of the instant invention, wherein the by-pass in switching array 705 is a reflective element as, for example, illustrated in FIG. 6A or 6B.

Of course, the above embodiments have been provided as examples only. It will be appreciated by those of ordinary skill in the art that various modifications, alternate configurations, and/or equivalents will be employed without departing from the spirit and scope of the invention. For example, addition optics, such at the field flattening wedge described in U.S. Pat. No. 6,760,501, which is hereby incorporated by reference, may be provided in any of the embodiments described hereto.

In addition, the WSS of the instant is typically reversible, that is, the light paths could be reversed such that ports described above as "input" ports would be output ports, and ports described as "output" ports would be input ports. Notably, the WSS of the instant invention can be used in various applications, such as for example, in the optical networks discussed in U.S. patent application Ser. No. 12/367,160 filed Feb. 6, 2009 to Colbourne. Accordingly, the scope of the invention is therefore intended to be limited solely by the scope of the appended claims.

What is claimed is:

1. A wavelength selective switch module comprising:
a first plurality of ports comprising M ports and a second plurality of ports comprising N ports, at least one of the ports in the first and second pluralities for providing a multiplexed light beam having K wavelength channels, where K, M, and N are integer numbers greater than one;
a first beam relayer including first and second elements having optical power, each of the first and second elements having optical power disposed such that light transmitted to or from the first plurality of ports passes through a common point, and is substantially focused at a first focal plane, the common point optically disposed between the first and second elements having optical power, the first focal plane spatially separated from the common point;
a wavelength dispersive element for spatially separating the multiplexed light beam into a plurality of wavelength channel sub-beams;
a first switching array including M rows, each row including K switching elements, each switching element in the first switching array for redirecting a different wavelength channel sub-beam incident thereon at a predetermined angle;
a second beam relayer for relaying light beams between the first focal plane, the wavelength dispersive element, and the first switching array, the second beam relayer including at least one element having optical power, each of the wavelength dispersive element and the first switching array disposed substantially one focal length away from the at least one element having optical power; and,
a second switching array including N switching elements, each switching element in the second switching array for redirecting wavelength channel sub-beams incident thereon at a predetermined angle, the second switching array including an optical by-pass disposed at the common point.

2. A wavelength selective switch module according to claim 1, comprising a third beam relayer for relaying light beams between the second switching array and the second plurality of ports, the third beam relayer including third and a fourth elements having optical power.

3. A wavelength selective switch module according to claim 2, wherein the first beam relayer is a beam expander and the third beam relayer is a beam reducer.

4. A wavelength selective switch module according to claim 1, wherein the first element having optical power comprises a first lens having a focal length $f_1$ and the second element having optical power comprises second lens having a focal length $f_2$, wherein the first lens is optically disposed between the first plurality of ports and the common point at a distance $f_1$ from each, and wherein the second lens is optically disposed between the common point and the first focal plane at a distance $f_2$ from each.

5. A wavelength selective switch module according to claim 4, wherein the at least one element having optical power includes third and fourth lenses, each of the third and fourth lenses having a focal length $f_3$.

6. A wavelength selective switch module according to claim 5, wherein the third lens is optically disposed between the first focal plane and the wavelength dispersive element at a distance $f_3$ from each, and wherein the fourth lens is optically disposed between the wavelength dispersive element and the first switching array at a distance $f_3$ from each.

7. A wavelength selective switch module according to claim 4, wherein the at least one element having optical power includes a concave mirror having a focal length $f_3$.

8. A wavelength selective switch module according to claim 7, wherein the first focal plane is the focal plane of the concave mirror, and wherein the wavelength dispersive element and the first switching array are each disposed within the first focal plane.

9. A wavelength selective switch module according to claim 1, wherein at least one of the first and second switching arrays comprises a MEMS micromirror array.

10. A wavelength selective switch module according to claim 9, wherein the first switching array comprises a MEMS micromirror array, and wherein each of the MEMS micromirrors is tiltable about two orthogonal axes.

11. A wavelength selective switch module according to claim 1, wherein at least one of the first and second switching arrays comprises an array of tunable liquid crystal phase delay elements.

12. A wavelength selective switch module according to claim 11, comprising polarization diversity optics disposed at the first focal plane.

13. A wavelength selective switch module according to claim 1, wherein the wavelength dispersive element comprises a diffraction grating.

14. A wavelength selective switch module according to claim 1, wherein the optical by-pass is a gap in the second switching array.

15. A wavelength selective switch module according to claim 1, wherein the optical by-pass comprises a first mirror oriented at a fixed angle, the first mirror oriented to redirect light launched from each port in the first plurality of ports to the second beam relayer.

16. A wavelength selective switch module according to claim 15, comprising a dump mirror, the dump mirror comprising a second mirror oriented at a fixed angle, the second mirror oriented to redirect light transmitted from the second beam relayer away from the second plurality of ports.

17. A wavelength selective switch module according to claim 1, wherein the second switching array comprises two spatially separated switching array sections, and wherein the optical by-pass comprises the gap between the two sections.

18. A wavelength selective switch module according to claim 1, wherein each port the first plurality of ports is an input port and each port in the second plurality of ports is an output port.

19. A wavelength selective switch module according to claim 18, wherein the second switching array is oriented such that that light transmitted from the plurality of input ports by-pass the switching elements of the second switching array, whereas each wavelength channel sub-beam transmitted from the second beam relayer is redirected by a switching element of the second switching array to one of the plurality of output ports.

20. A wavelength selective switch module according to claim 1, wherein each port the first plurality of ports is an output port and each port in the second plurality of ports is an input port.

21. A wavelength selective switch module comprising:
a first plurality of ports;
a first beam relayer including first and second elements having optical power, the first beam relayer for forcing light beams launched from or to the first plurality of ports to intersect at a common point, the first and second elements having optical power disposed such that light transmitted from the first plurality of ports is substantially focused at a first plane, the common point optically disposed between the first and second elements having optical power, the common point spatially separated from the first plane;
a wavelength dispersive element for spatially separating a multiplexed beam of light into a plurality of wavelength channel sub-beams;
a first switching array including a first plurality of switching elements, each switching element in the first switching array for redirecting a different wavelength channel sub-beam transmitted from the wavelength dispersive element at a predetermined angle;
a second beam relayer for relaying light between the first plane, the wavelength dispersive element, and the first switching array, the second beam relayer including at least one element having optical power; and
a second switching array including a second plurality of switching elements, each switching element in the second switching array for redirecting light to or from a second other plurality of ports;
wherein the second switching array is disposed about the common point such that light propagating in a first propagating direction towards the first plane circumvents the switching elements in the second switching array, whereas light propagating in a second opposite propagating direction is redirected by the switching elements in the second switching array in dependence upon an angle at which it was redirected away from the first switching array.

* * * * *